(12) United States Patent
Kanayama

(10) Patent No.: US 8,310,652 B2
(45) Date of Patent: Nov. 13, 2012

(54) IMAGE TAKING SYSTEM AND LENS APPARATUS

(75) Inventor: Masaomi Kanayama, Saitama (JP)

(73) Assignee: Canon Kabushiki Kaisha (JP)

( * ) Notice: Subject to any disclaimer, the term of this patent is extended or adjusted under 35 U.S.C. 154(b) by 231 days.

(21) Appl. No.: 12/888,026

(22) Filed: Sep. 22, 2010

(65) Prior Publication Data

US 2011/0075125 A1     Mar. 31, 2011

(30) Foreign Application Priority Data

Sep. 30, 2009   (JP) .................................. 2009-227146

(51) Int. Cl.
*G01C 3/08* (2006.01)
(52) U.S. Cl. ....................... 356/4.06; 356/4.01; 356/4.05
(58) Field of Classification Search ........ 356/3.01–3.15, 356/4.01–4.1, 5.01–5.15, 6–22
See application file for complete search history.

(56) References Cited

U.S. PATENT DOCUMENTS 5,642,299 A * 6/1997 Hardin et al. ................. 702/142

FOREIGN PATENT DOCUMENTS

| JP | 6003581 A | 1/1994 |
|---|---|---|
| JP | 2001-124544 A | 5/2001 |
| JP | 2003-329915 A | 11/2003 |
| JP | 2004-208122 A | 7/2004 |
| JP | 2004208122 A | 7/2004 |
| JP | 2005156356 A | 6/2005 |
| JP | 2006-145641 A | 6/2006 |
| JP | 2006145641 A | 6/2006 |
| JP | 2006-261995 A | 9/2006 |
| JP | 2006261995 A | 9/2006 |
| JP | 2007-134845 A | 5/2007 |
| JP | 2007134845 A | 5/2007 |
| JP | 2008270896 A | 11/2008 |
| JP | 2009-049810 A | 3/2009 |
| JP | 2009049810 A | 3/2009 |

* cited by examiner

*Primary Examiner* — Luke Ratcliffe
(74) *Attorney, Agent, or Firm* — Rossi, Kimms & McDowell LLP

(57) ABSTRACT

An image taking system including: a lens apparatus; an image pickup apparatus; an operation angle detection unit detecting an operation angle; a direction storage unit storing an object direction relative to the lens apparatus; an angle-of-field calculation unit calculating an image taking angle of field based on zoom and focus positions; a ranging area setting unit calculating a position of at least one object in a screen based on the operation angle detected by the operation angle detection unit, the object direction stored in the direction storage unit, and the image taking angle of field calculated by the angle-of-field calculation unit, to set a ranging area at the position of the at least one object; an object distance calculation unit calculating an object distance in the ranging area; and an output image generation unit generating an output image and information based on the object distance.

10 Claims, 7 Drawing Sheets

IMAGE TAKING SYSTEM AND LENS APPARATUS

BACKGROUND OF THE INVENTION

1. Field of the Invention

The present invention relates to an image taking system and a lens apparatus that have a ranging function.

2. Description of the Related Art

In conventional television live broadcast such as marathon live broadcast, for example, a distance between a first place runner and a second place runner is often announced. The distance between the runners at this time is roughly measured by an announcer or a reporter by sight, or calculated based on a period of time from a time when the first place runner passes a certain point until a time when the second place runner passes the point and running speeds of the runners. Therefore, the distance between the runners announced by the announcer or the like is not accurate. Further, the viewer cannot visually perceive the distance only by the announcer or the like vocally announcing the distance to the viewer.

Japanese Patent Application Laid-Open No. 2003-329915 discloses the following image taking system. First, manual focus is performed on a first object, and a distance to the first object is calculated based on an in-focus position of a focus lens. Subsequently, manual focus is performed on a second object in the same manner as described above, and a distance to the second object is calculated based on an in-focus position of the focus lens. Then, a difference between the calculated distances to the first and second objects is determined, and information on the difference is displayed as being superimposed on an image signal.

Japanese Patent Application Laid-Open No. 2001-124544 discloses the following ranging apparatus. An object is irradiated with ranging light, and its reflected light is received by a charge coupled device (CCD), to thereby detect a distance to the object corresponding to each pixel based on an amount of the received light. Such a ranging apparatus is a so-called active multi-point ranging apparatus. A touch panel is disposed in a display device for displaying a taken image, and a pointing pen is used for selecting a pixel corresponding to a measurement point. Alternatively, a direction indication button is provided to the apparatus, with which a cursor on a screen is controlled, to thereby select a pixel corresponding to a measurement point. Then, a distance corresponding to the selected pixel is displayed on the screen.

With the ranging apparatus disclosed in Japanese Patent Application Laid-Open No. 2001-124544, distances to multiple objects may be calculated and displayed without performing the focus operation as in the system disclosed in Japanese Patent Application Laid-Open No. 2003-329915.

However, in the case of the ranging apparatus disclosed in Japanese Patent Application Laid-Open No. 2001-124544, in a style of taking a moving image in the marathon live broadcast or the like, a person taking the image needs to use the pointing pen or operate the direction indication button to designate a measurement point while taking the moving image, which complicates the operation of the person taking the image.

Further, when the person taking the image performs panning (hereinafter, referred to as "pan") and tilting (hereinafter, referred to as "tilt") operations or a zoom operation after designating the measurement point, the person taking the image needs to select a measurement point again because the designated measurement point deviates from the intended object. Particularly in such a case as the marathon live broadcast where the person taking the image wishes to select multiple measurement points, the above-mentioned complicated operation may be highly burdensome to the person taking the image.

SUMMARY OF THE INVENTION

It is therefore an exemplary object of the present invention to provide an image taking system and a lens apparatus that facilitate a selection operation of selecting at least one object, and eliminate a need to select the object again even if a pan, tilt, or zoom operation is performed after the selection.

In order to achieve the above-mentioned object, according to an aspect of the present invention, there is provided an image taking system including: a lens apparatus; an image pickup apparatus; an operation angle detection unit for detecting an operation angle of the lens apparatus; a direction storage unit for storing a direction of an object with respect to the lens apparatus; an angle-of-field calculation unit for calculating an image taking angle of field based on a zoom position and a focus position of the lens apparatus; a ranging area setting unit for calculating a position of at least one object in an image taking screen based on the operation angle detected by the operation angle detection unit, the direction of the object stored in the direction storage unit, and the image taking angle of field calculated by the angle-of-field calculation unit, to thereby set a ranging area at the position of the at least one object; an object distance calculation unit for calculating an object distance in the ranging area; and an output image generation unit for generating an output image containing a taken image generated by the image pickup apparatus and information based on the object distance corresponding to the ranging area.

According to another aspect of the present invention, there is provided a lens apparatus including the direction storage unit, the angle-of-field calculation unit, the ranging area setting unit, and the object distance calculation unit.

According to the present invention, the pan/tilt operation angle is detected, which facilitates the operation of selecting at least one object. Further, the object distance can be displayed without selecting the object again even if the pan/tilt operation or the zoom operation is performed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
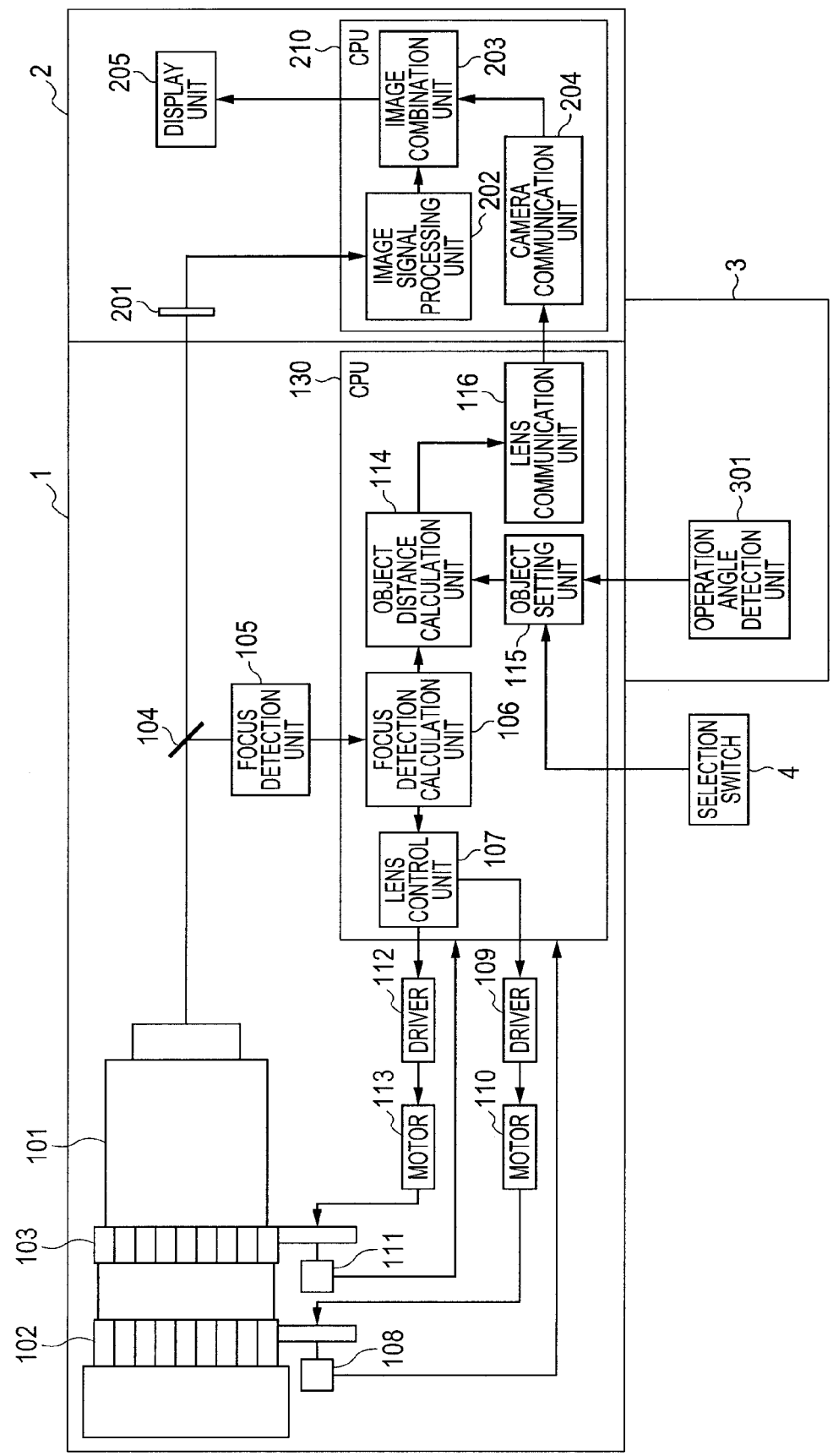
FIG. 1 is a block diagram illustrating a configuration of an image taking system according to a first embodiment of the present invention.

FIG. 1 illustrates a configuration of an image taking system according to a first embodiment of the present invention. The image taking system includes a lens apparatus 1, a camera for taking a moving image (image pickup apparatus) 2, a tripod (support member) 3 for supporting the lens apparatus 1 and the camera 2, and a selection switch 4 for selecting an object. The lens apparatus 1 is detachable (replaceable) with respect to the camera 2.

The camera 2 includes an image pickup element 201 constituted by a CCD sensor or a complementary metal oxide semiconductor (CMOS) sensor (hereinafter, referred to as "CCD").

Further, the lens apparatus 1 and the camera 2 include a lens CPU 130 and a camera CPU 210, respectively.

A lens barrel 101 included in the lens apparatus has an optical system incorporated therein, including optical adjustment members (not shown) such as a focus lens, a magnification-varying lens, and an iris. The optical system is a so-called front lens focus type optical system, in which the focus lens is disposed closest to an object side.

The lens barrel 101 is provided with a focus drive ring 102 for transferring drive power from a focus motor 110 to the focus lens, to thereby move the focus lens in an optical axis direction. The lens barrel 101 is further provided with a zoom drive ring 103 for transferring drive power from a zoom motor 113 to the magnification-varying lens, to thereby move the magnification-varying lens in the optical axis direction.

The lens apparatus 1 has a half mirror 104 disposed on a rear side (image plane side) of the lens barrel 101. A light beam from an object, which passes through the lens barrel 101 (that is, enters the lens apparatus 1) and reaches the half mirror 104, is split into a light beam transmitted through the half mirror 104 and a light beam reflected on the half mirror 104.

The light beam transmitted through the half mirror 104 enters the CCD 201. The light beam reflected on the half mirror 104 enters a focus detection unit 105, which is disposed at a conjugate position to the CCD 201 in the lens apparatus 1.

Figure 2:
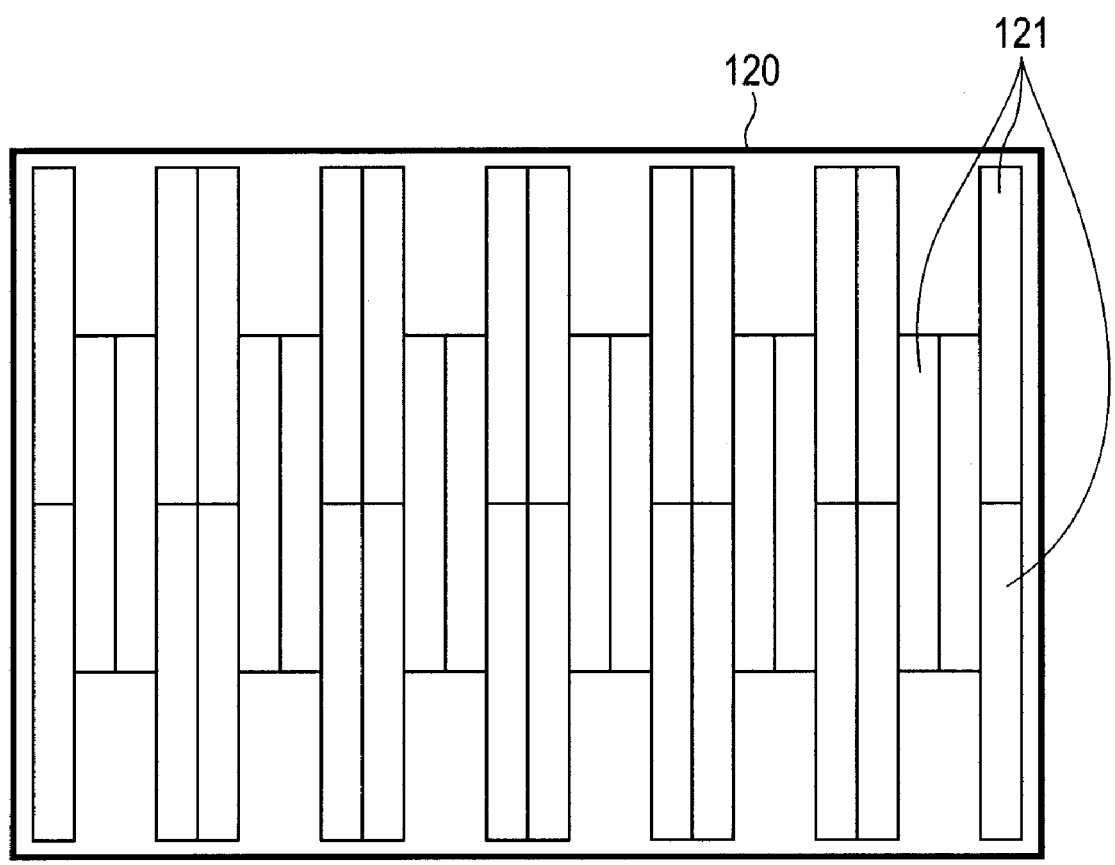
FIG. 2 is a diagram illustrating a configuration of an autofocus (AF) sensor according to the first embodiment.

The focus detection unit 105 includes multiple pairs of secondary imaging lenses (not shown), and an AF sensor 120 illustrated in FIG. 2 as a phase difference sensor. The AF sensor 120 has multiple pairs of line sensors (photoelectric conversion element array) 121 disposed thereon.

On each pair of line sensors 121, a pair of object images (hereinafter, referred to as "two images") are formed from two light beams obtained by splitting the light beam reflected on the half mirror 104 by each pair of secondary imaging lenses. Each pair of line sensors 121 output two image signals obtained through photoelectric conversion on the two images. The above-mentioned two images, that is, the two image signals have a phase difference according to a focus state of the lens apparatus 1 (optical system).

In an in-focus state of the lens apparatus 1, the phase difference, which corresponds to an interval between the two images (between the object images), exhibits a specific value. In a case of so-called front focus where an in-focus position is at a closer distance position than the position of the object, the phase difference is smaller than the specific value. In a case of so-called back focus where an in-focus position is at a farther distance position than the position of the object, the phase difference is larger than the specific value. As described above, the focus detection unit 105 (AF sensor 120) has a function of detecting the phase difference between the object images (two images) formed from the light beam entering the lens apparatus 1.

The two image signals from each pair of line sensors 121 are input to a focus detection calculation unit 106. The focus detection calculation unit 106 performs correlation calculation on the two image signals, calculates the phase difference between the image signals, and further calculates a defocus amount of the lens apparatus 1 based on the phase difference. In this manner, multiple defocus amounts corresponding to the multiple pairs of line sensors 121 provided on the AF sensor 120 are calculated. The multiple defocus amounts thus calculated are input to a lens control unit (focus control unit) 107 and an object distance calculation unit 114.

When a user adjusts a focus on the object through a focus operation (described later), the lens apparatus 1 of this embodiment further adjusts the focus on the object more accurately through an AF operation. For this purpose, the lens control unit 107 selects a minimum defocus amount of the multiple defocus amounts thus input thereto, as an AF defocus amount.

Note that, the user may arbitrarily select an AF area (focus detection area) in an image taking screen, on which the user wishes to adjust the focus, by operating an operation member such as an arrow key. In this case, a defocus amount obtained by using a pair of line sensors included in the AF area may be calculated as the AF defocus amount.

The lens CPU 130 detects a rotation position of the focus drive ring 102, that is, a position of the focus lens, through a focus position detector 108. The lens CPU 130 further detects a rotation position of the zoom drive ring 103, that is, a position of the magnification-varying lens, through a zoom position detector 111.

Then, the lens control unit 107 calculates a movement amount of the focus lens based on the positions of the focus lens and the magnification-varying lens detected by the lens CPU, and the above-mentioned AF defocus amount. The movement amount of the focus lens is used for setting the in-focus position of the object for which the two images are formed on the pair of line sensors 121 which output the image signals used for the calculation of the AF defocus amount.

Then, the lens control unit 107 drives the focus motor 110 via a focus driver 109 to rotate the focus drive ring 102 so that the focus lens moves in the optical axis direction by the calculated movement amount. Accordingly, the autofocus (AF) operation is performed.

In the lens apparatus 1 of this embodiment, a focus instruction signal is input to the lens control unit 107 through a focus operation member (focus switch) (not shown) operated by the user. The lens control unit 107 drives the focus motor 110 via the focus driver 109 in response to the focus instruction signal, to thereby rotate the focus drive ring 102. Accordingly, servo-controlled focus drive is performed.

Further, a zoom instruction signal is input to the lens control unit 107 through a zoom operation member (zoom switch) (not shown) operated by the user. The lens control unit 107 drives the zoom motor 113 via a zoom driver 112 in response to the zoom instruction signal, to thereby rotate the zoom drive ring 103. Accordingly, the magnification-varying lens moves and servo-controlled zoom drive is performed.

The tripod 3 is provided with an operation angle detection unit 301, which is connected to an object setting unit 115. The operation angle detection unit 301 detects a pan/tilt operation angle of the lens apparatus 1 with respect to the tripod 3, and outputs a digital signal indicating a value corresponding to a pan/tilt operation. In this embodiment, at the time of power-on, the operation angle detection unit 301 outputs reference position data representing a pan/tilt position as a reference position, and thereafter outputs operation angle data that is proportional to a pan/tilt relative position with respect to the reference position. The pan/tilt operation angle detection unit 301 may be implemented by, for example, an incremental rotary encoder and a counter.

As for the selection switch 4, a person taking an image uses the selection switch 4 for selecting an object for which the person taking the image wishes to display the distance (an object selection method is described later) so that a horizontal angle and a vertical angle that indicate a direction of the selected object (object to be displayed) are stored in the object setting unit 115.

The object setting unit 115 includes an angle-of-field calculation unit. The angle-of-field calculation unit calculates a present image taking angle of field based on a present position of the focus lens and a present position of the magnification-varying lens respectively obtained from the focus position detector 108 and the zoom position detector 111 via the lens CPU 130. The object setting unit 115 further includes a ranging area setting unit. The ranging area setting unit calculates a position of the object to be displayed in the image taking screen based on the image taking angle of field, a present pan/tilt position of the lens apparatus 1, and the horizontal angle and the vertical angle that indicate the direction of the selected object to be displayed, and then sets a ranging area at the position of the object to be displayed. The user may arbitrarily change setting of the shape of the ranging area.

Therefore, the AF sensor 120 illustrated in FIG. 2 has a large number of the line sensors 121 arranged thereon so that the user may select the position, the size, and the number of the ranging areas in the image taking screen with a high degree of freedom.

The object distance calculation unit 114 receives, from the focus detection calculation unit 106, the input of the multiple defocus amounts obtained by using the multiple pairs of line sensors 121 arranged on the AF sensor 120. The object distance calculation unit 114 selects a pair of line sensors 121 from among the multiple pairs of line sensors 121 included in each ranging area that is set to the object to be displayed. Based on the defocus amount obtained by using the pair of line sensors 121, the object distance calculation unit 114 calculates a distance to the object (object distance) for each ranging area in the following manner. A selection method for the "pair of line sensors 121" is described later.

The object distance calculation unit 114 fetches the defocus amount in each ranging area, and the present position of the focus lens and the present position of the magnification-varying lens respectively obtained from the focus position detector 108 and the zoom position detector 111 via the lens CPU 130. Subsequently, the object distance calculation unit 114 calculates an in-focus position of the focus lens (in-focus lens position) on the object included in the ranging area, based on the defocus amount and the present position of the focus lens. Then, the object distance calculation unit 114 calculates the object distance based on the in-focus lens position and the present position of the magnification-varying lens.

The object distance calculation unit 114 is connected to a lens communication unit 116. The lens communication unit 116 sends and receives data through serial communication to and from a camera communication unit 204 provided to the camera 2. The lens communication unit 116 sends, to the camera communication unit 204, information on the object distance (distance information) in the ranging area that is set to the object to be displayed, and coordinate information (screen position information) on the ranging area in the image taking screen to be output by a ranging position output unit (not shown).

Note that, the focus detection calculation unit 106, the lens control unit 107, the object distance calculation unit 114, the object setting unit 115, and the lens communication unit 116 are included in the lens CPU 130.

In the camera 2, a signal output from the CCD 201 is input to an image signal processing unit 202. The image signal processing unit 202 performs various kinds of processing on the signal output from the CCD 201, to thereby generate a taken image signal (taken image). The taken image signal is output to an image combination unit (output image generation unit) 203.

The image combination unit 203 receives the object distance information and the ranging area coordinate information input from the lens apparatus 1 via the camera communication unit 204. The image combination unit 203 combines the object distance information with the taken image signal, to thereby generate an output image signal (output image). Specifically, the image combination unit 203 generates the output image obtained by superimposing the object distance information on the position corresponding to the ranging area coordinate information within the taken image.

The output image signal is output to a display unit 205 or an external device.

The image signal processing unit 202, the image combination unit 203, and the camera communication unit 204 are included in the camera CPU 210.

Figure 3:
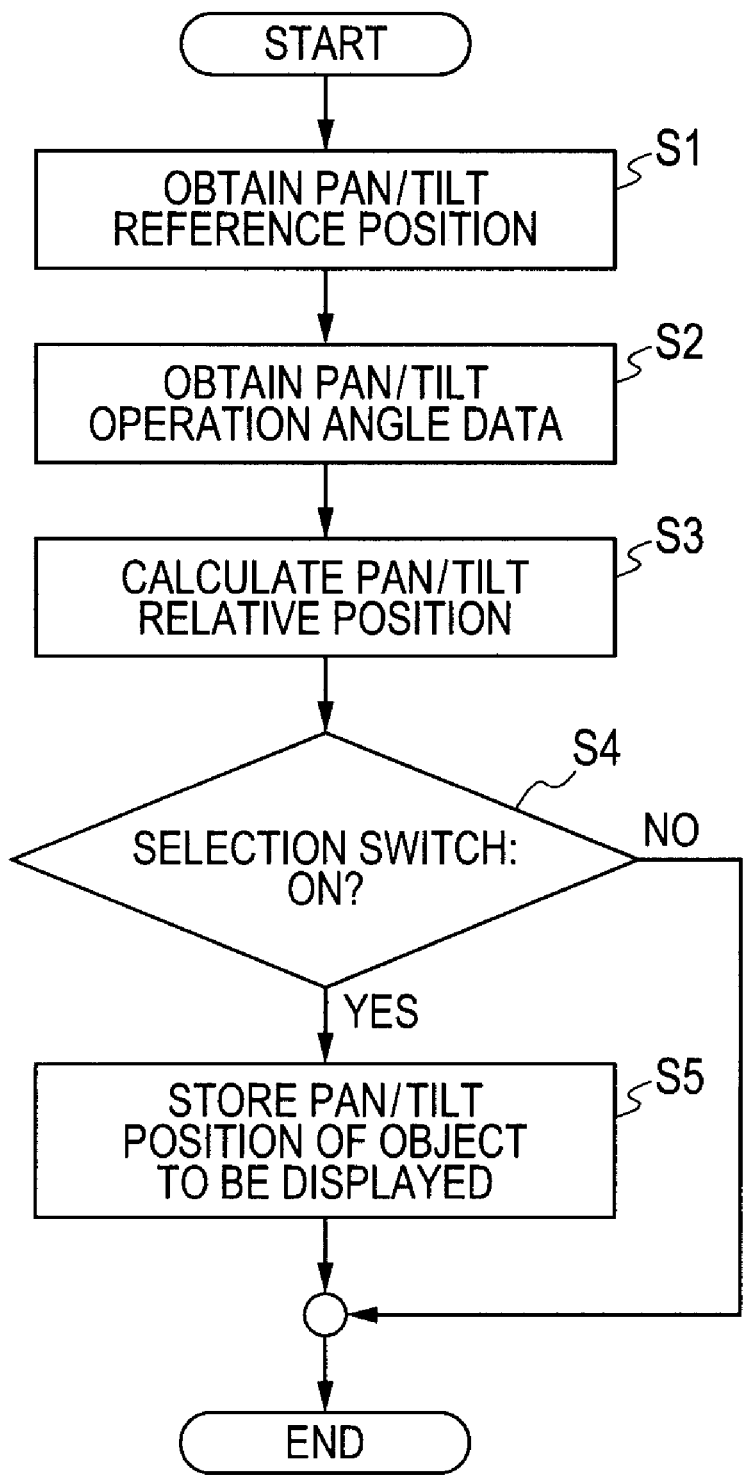
FIG. 3 is a flow chart illustrating a flow of storage processing for a horizontal angle and a vertical angle that indicate a direction of an object to be displayed according to the first embodiment.

A flow chart of FIG. 3 illustrates a flow of storage processing for the horizontal angle and the vertical angle that indicate the direction of the object to be displayed. The lens CPU 130 controls the processing according to a computer program stored in a memory (not shown).

When the lens apparatus 1 is powered on, the processing of the lens CPU 130 proceeds to Step S1, in which the object setting unit 115 obtains pan and tilt reference positions from the operation angle detection unit 301. Subsequently, in Step S2, the object setting unit 115 obtains pan/tilt operation angle data (absolute position) of the lens apparatus 1. Then, in Step S3, the object setting unit 115 calculates pan and tilt positions (pan and tilt relative positions) with respect to the reference positions based on the pan and tilt operation angle data (absolute position). In Step S4, the object setting unit 115 determines whether or not the selection switch 4 is turned ON. When the selection switch 4 is turned ON, the processing proceeds to Step S5. When the selection switch 4 remains OFF, the processing ends. In Step S5, the object setting unit 115 stores the present pan and tilt relative positions as the horizontal angle and the vertical angle that indicate the direction of the object to be displayed. When the horizontal angle and the vertical angle of the object to be displayed are stored, the processing ends. In this processing, the position obtained in Step S2 may be set as a first relative position, and the position calculated in Step S3 may be set as a second relative position.

In the processing of the lens CPU 130, Step S1 is performed only at the time of power-on, and after the power-on, the flow of Steps S2 to S5 is repeated in a fixed cycle.

The object setting unit 115 constantly obtains the present pan and tilt relative positions of the lens apparatus 1, and thus stores therein the horizontal angles and the vertical angles that indicate the directions of the objects to be displayed, the number of the horizontal angles and the vertical angles corresponding to the number of times the selection switch 4 is turned ON.

Figure 4:
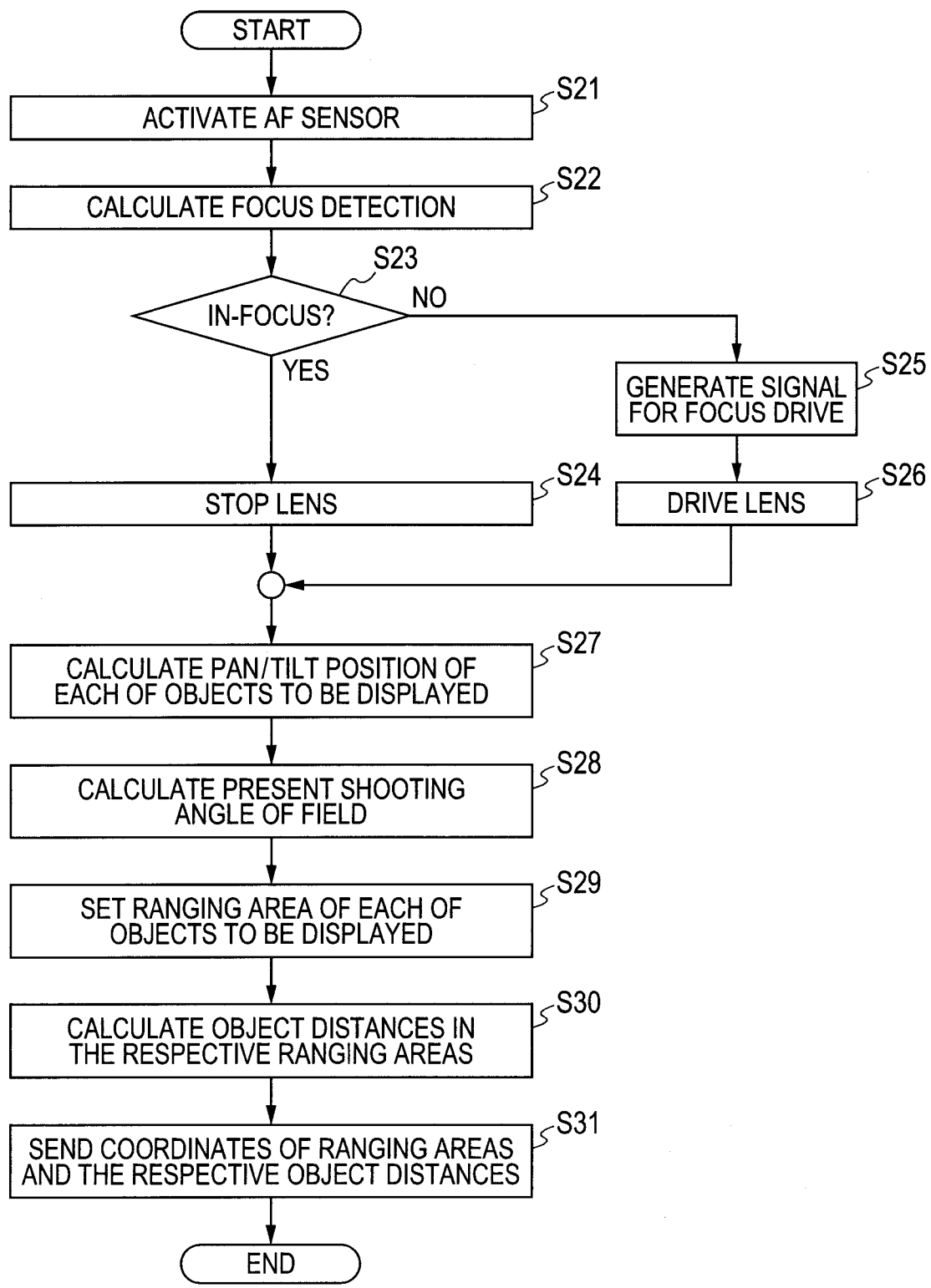
FIG. 4 is a flow chart illustrating a flow of AF processing and calculation processing for an object distance according to the first embodiment.

A flow chart of FIG. 4 illustrates a flow of AF processing and calculation processing for the object distance performed in the lens apparatus 1. The lens CPU 130 controls the processing according to the computer program stored in the memory (not shown).

When the lens apparatus 1 is powered on, the processing of the lens CPU 130 proceeds to Step S21, in which the AF sensor 120 of the focus detection unit 105 is activated. Then, in Step S22, the focus detection calculation unit 106 calculates a defocus amount based on the phase difference obtained by each pair of line sensors 121. Then, the lens control unit 107 selects a minimum defocus amount of the multiple defocus amounts input from the focus detection calculation unit 106, as the AF defocus amount. The AF defocus amount is used for performing the AF operation on an object whose in-focus position is to be set closest to the present position of the focus lens.

Subsequently, in Step S23, the lens control unit 107 checks the present position of the focus lens through the focus position detector 108 to determine whether or not the value of the AF defocus amount falls within an in-focus range. When the value of the AF defocus amount falls within the in-focus range, the lens control unit 107 recognizes the present state as the in-focus state, and then the processing proceeds to Step S24, in which the focus lens remains stopped. Then, the processing of the lens CPU 130 proceeds to Step S27.

When the value of the AF defocus amount falls out of the in-focus range, on the other hand, the processing proceeds to Step S25, in which the lens control unit 107 calculates an in-focus lens position based on the AF defocus amount and the present position of the focus lens. Then, the lens control unit 107 generates a signal for focus drive to be supplied to the focus driver 109 for moving the focus lens to the in-focus lens position.

Subsequently, in Step S26, the lens control unit 107 outputs the signal for focus drive to the focus driver 109. Accordingly, the focus motor 110 is driven to rotate the focus drive ring 102, with the result that the focus lens moves to the in-focus lens position. Then, the processing of the lens CPU 130 proceeds to Step S27.

In Step S27, the object setting unit 115 converts the stored horizontal angle and vertical angle that indicate the direction of the object to be displayed, which are described with reference to FIG. 3, from a relative value with respect to the reference position at the time of power-on into a relative value of a lens apparatus reference with respect to the present pan/tilt position (operation angle) of the lens apparatus 1. In other words, the object setting unit 115 determines a relative direction of the target object with respect to the present operation angle (direction) of the lens apparatus 1. Subsequently, in Step S28, the object setting unit 115 calculates a present image taking angle of field based on the position of the focus lens and the position of the magnification-varying lens respectively obtained from the focus position detector 108 and the zoom position detector 111. Then, in Step S29, the object setting unit 115 determines whether or not each object to be displayed is located in the present image taking angle of field. When each object to be displayed is located in the image taking angle of field, the object setting unit 115 calculates a position of the object to be displayed in the image taking screen based on the image taking angle of field and the horizontal angle and the vertical angle of the lens apparatus reference of the object to be displayed, and then sets a ranging area at the position in the image taking screen.

In Step S30, an object distance in each set ranging area is calculated. The object distance calculation unit 114 selects a pair of line sensors to be used for ranging calculation from among the multiple pairs of line sensors 121 included in the set ranging area. Specifically, the object distance calculation unit 114 performs correlation calculation in which a matching degree of the two image signals output from each pair of line sensors 121 is determined.

Then, the object distance calculation unit 114 selects a pair of line sensors having the highest matching degree of the two image signals, as a pair of line sensors for ranging. Then, the object distance calculation unit 114 uses the defocus amount obtained based on the phase difference between the two image signals from the pair of line sensors for ranging, and the present positions of the focus lens and the magnification-varying lens, to thereby calculate the object distance in the selected ranging area.

In Step S31, the object distance calculation unit 114 sends, via the lens communication unit 116 to the camera 2, object distance information and image taking screen position information (coordinate information) for each set ranging area. After the sending is completed, the processing ends.

In the processing of the lens CPU 130, the flow of Steps S21 to S31 is repeated in a fixed cycle.

FIGS. 5A to 5D each illustrate the object selection method and a display of the object distance, as an example. Described below is an example in which an image including a first place runner (runner A) and a second place runner (runner B) is taken, the runners are selected as the objects to be displayed, and distances thereof are displayed. The runner A is located at a distance of 20 m from the lens apparatus 1 while the runner B is located at a distance of 30 m therefrom.

Figure 5A:
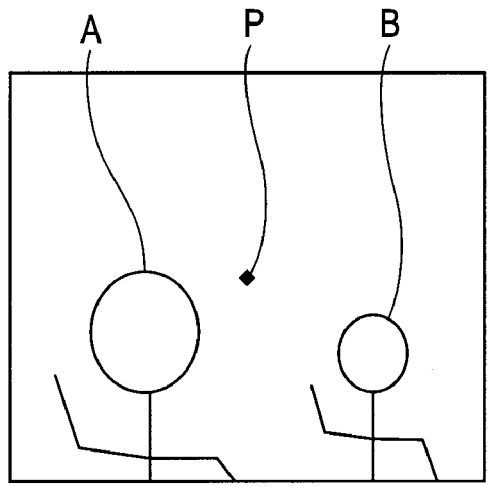
FIG. 5A is a diagram illustrating an object selection method and a display example of the object distance.

FIG. 5A illustrates a state before the object selection, in which the image including the runners A and B is being taken. A selection point P is provided in the center of the screen, and when the object is aligned with the selection point P and the selection switch 4 is depressed, the object to be displayed is selected.

Figure 5B:
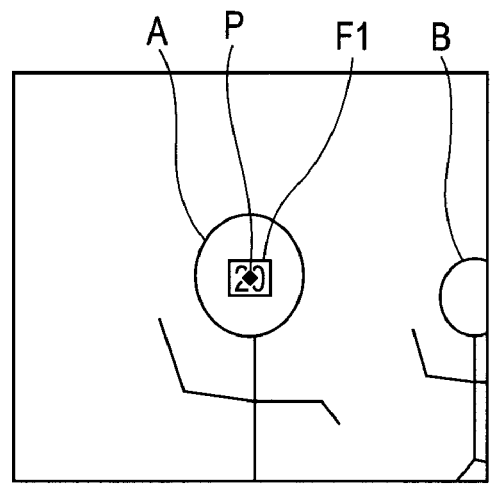
FIG. 5B is a diagram illustrating the object selection method and the display example of the object distance.

First, the pan/tilt operation is performed so that the runner A is aligned with the selection point P. After the selection point P is aligned with the runner A, the selection switch 4 is depressed. When the selection switch 4 is depressed, the object setting unit 115 stores therein the pan and tilt positions of the lens apparatus 1 as the horizontal angle and the vertical angle that indicate the direction of the runner A. Then, a ranging area F1 is set at a position (position of the selection point P at this time) in the screen showing the runner A, and the object distance calculation unit 114 calculates the object distance. The ranging position output unit (not shown) outputs position information indicating the position of the ranging area F1, and then the object distance corresponding to the ranging area is displayed at the screen position of the ranging area F1 corresponding to the position information in the taken image. FIG. 5B illustrates a state in which the runner A is selected.

Figure 5C:
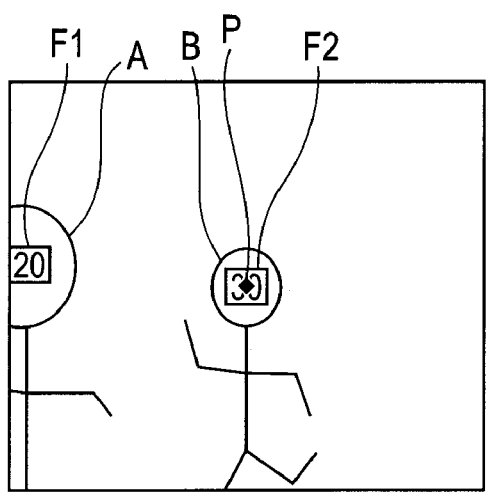
FIG. 5C is a diagram illustrating the object selection method and the display example of the object distance.

Next, the pan/tilt operation is performed so that the runner B is aligned with the selection point P. After the selection point P is aligned with the runner B, the selection switch 4 is depressed. When the selection switch is depressed, a ranging area F2 is set and the object distance is displayed at the screen position of the ranging area F2 as in the case of the runner A. Note that, the pan and tilt positions of the lens apparatus 1 are detected also during the selection operation, and the position of the ranging area F1 in the screen is updated. Hence, as for the runner A, too, the ranging area F1 moves in the screen as being set to the runner A. FIG. 5C illustrates a state in which the runner B is selected.

Figure 5D:
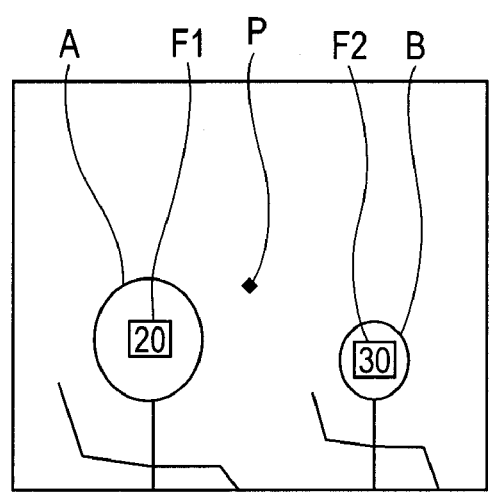
FIG. 5D is a diagram illustrating the object selection method and the display example of the object distance.

Then, when the pan/tilt operation is performed so that an intended frame composition is obtained, the ranging area F1 and the ranging area F2 respectively set in the same manner to the runner A and the runner B are updated along with the pan/tilt operation, and move in the screen as being set to the runner A and the runner B, respectively, with the result that the object distances may be displayed. FIG. 5D illustrates a state in which the frame composition is reset to the frame composition as in FIG. 5A after the runner A and the runner B are selected.

As described above, by using the pan and tilt positions obtained by the operation angle detection unit 301, the object can be selected simply through the ON operation for the selection switch 4, instead of an operation using a pointing pen or a direction indication button as in the conventional technology. Further, by attaching the selection switch 4 to the vicinity of the zoom operation member or the focus operation member, the person taking the image can easily select at least one object with no bother in the servo-controlled zoom/focus operation.

In the example of FIGS. 5A to 5D, the object distance of the object in the ranging area is displayed at the screen position of the ranging area, but the present invention is not limited thereto. For example, information based on the object distance, such as a relative distance with respect to a certain object or a predetermined distance, may be displayed.

FIGS. 6A, 6B, 7A, 7B, 8A and 8B each illustrate how the ranging areas are set at the time of the pan operation and the zoom operation after the object selection. In this case, for the simplicity of the description, only the setting in a pan direction, that is, a horizontal angle of field is described, but the same operation applies to the setting in a tilt direction, that is, a vertical angle of field.

Figure 6A:
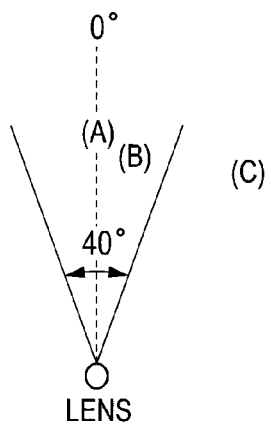
FIG. 6A is a diagram illustrating an example of a positional relation between a lens apparatus and objects.
Figure 6B:
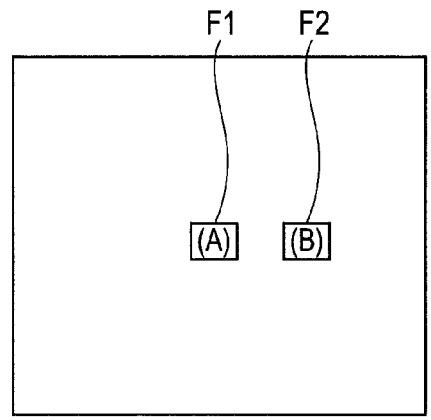
FIG. 6B is a diagram illustrating an image taking screen in the positional relation between the lens apparatus and the objects illustrated in FIG. 6A.

FIG. 6A is a diagram illustrating a positional relation between the lens apparatus 1 and the objects. Three objects A, B and C are involved in this case, and with respect to the pan position at the time when the lens apparatus 1 is powered on (0°), the object A is located at a position of 0° in the pan operation direction; the object B, 10°; and the object C, 40°. The horizontal angles are stored for the objects by the object selection method described with reference to FIGS. 5A to 5D. At this time, the horizontal angle of field of the lens apparatus 1 is 40°. FIG. 6B is a diagram illustrating an image taking screen obtained when the objects have the positional relation illustrated in FIG. 6A. The object A is located in the center of the image taking screen in the horizontal direction and the object B is located to the right of the object A. Based on the present pan position (0°) and the stored horizontal angles of the positions of the objects, positions of the objects A and B in the image taking screen are calculated, and the ranging areas F1 and F2 are set thereto, respectively.

Figure 7A:
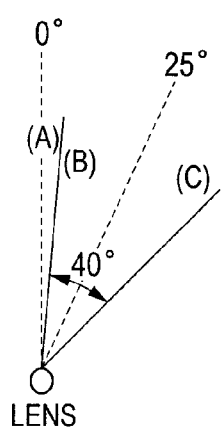
FIG. 7A is a diagram illustrating an example of a positional relation between the lens apparatus and the objects.
Figure 7B:
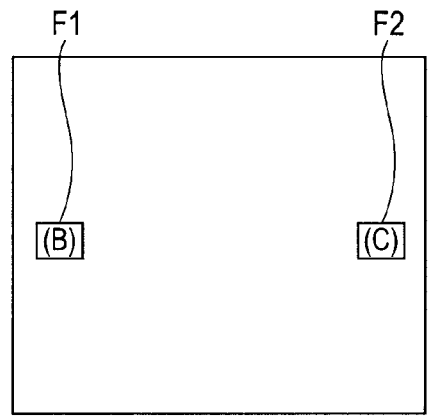
FIG. 7B is a diagram illustrating an image taking screen in the positional relation between the lens apparatus and the objects illustrated in FIG. 7A.

FIG. 7A is a diagram illustrating a state after the pan operation is performed to orient the lens apparatus to the right at 25° from the positional relation illustrated in FIG. 6A. FIG. 7B is a diagram illustrating an image taking screen at this time. The object A is located outside the image taking screen, and hence no ranging area is set thereto, while for the objects B and C, positions thereof in the image taking screen are calculated and the ranging areas F1 and F2 are set thereto, respectively.

Figure 8A:
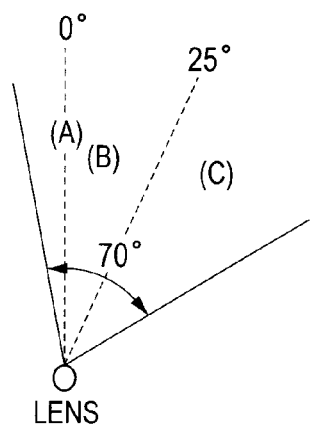
FIG. 8A is a diagram illustrating an example of a positional relation between the lens apparatus and the objects.
Figure 8B:
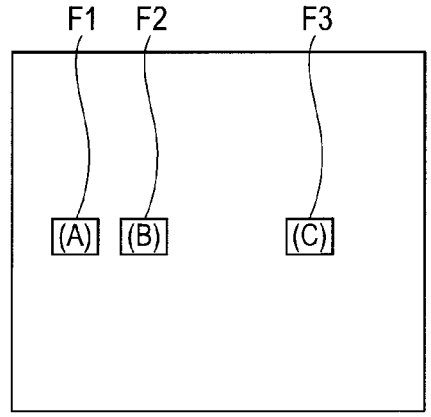
FIG. 8B is a diagram illustrating an image taking screen in the positional relation between the lens apparatus and the objects illustrated in FIG. 8A.

FIG. 8A is a diagram illustrating a state after zoom drive of the lens apparatus 1 is performed to magnify the horizontal angle of field to 70° from the positional relation illustrated in FIG. 7A. FIG. 8B is a diagram illustrating an image taking screen at this time. Because the horizontal angle of field became larger, the object A is also included in the image taking screen. Hence, positions of the objects A, B and C in the image taking screen are calculated and the ranging areas F1, F2 and F3 are set thereto, respectively. Note that, in FIGS. 6A, 6B, 7A, 7B, 8A and 8B, the object distances are not displayed, but in actuality, the object distances are calculated by using the line sensors 121 included in the set ranging areas, which are then displayed.

As described above, according to this embodiment, by storing the actual horizontal angles and vertical angles of the objects with respect to the lens apparatus 1 instead of the positions thereof in the image taking screen, the ranging areas can be set at the actual positions of the objects even if the pan/tilt operation or the zoom operation for the lens apparatus 1 is performed after the object selection. Accordingly, the object distances can be displayed without selecting the objects again.

Further, according to this embodiment, the pan and tilt positions of the lens apparatus 1 are detected, and thus only the selection switch 4 can be employed as the object selection member. Accordingly, when the person taking the image selects objects in the marathon live broadcast or the like, the person taking the image can easily select at least one object with no need to perform the complicated operation using the pointing pen or the direction indication button.

Note that, in this embodiment, the selection switch 4 is provided to the image taking system as a separate switch, but may alternatively be provided as part of so-called lens accessories such as the zoom operation member and the focus operation member, used in combination with another switch, or included as a component in the lens apparatus.

Further, in this embodiment, the operation angle detection unit 301 constituted by the rotary encoder and the counter mounted on the tripod, is employed as the operation angle detection means, but the present invention is not limited thereto. For example, the operation angle may be calculated by using an angular velocity sensor or an angle sensor.

Further, in this embodiment, the method of selecting an object manually through the input of the selection switch 4 and storing the horizontal angle and the vertical angle of the object is described, but the present invention is not limited thereto. For example, the following processing may be employed. That is, an object located at a certain fixed object distance is extracted automatically as the object to be displayed, and the horizontal angle and the vertical angle of the extracted object are calculated and stored.

Further, in this embodiment, when multiple pairs of line sensors are included in each ranging area, a pair of line sensors having the highest matching degree of the two image signals are selected, and the object distance is calculated based on the phase difference obtained by using the pair of line sensors. However, the calculation method for the object distance is not limited thereto. For example, multiple object distances may be calculated based on the phase differences obtained by the multiple pairs of line sensors in each ranging area, and an average value thereamong may be determined as the object distance in the ranging area. Alternatively, multiple object distances obtained by using the multiple pairs of line sensors provided in each ranging area are weighted according to the positions of the line sensors, and one object distance may be selected from among or generated based on the weighted object distances following a predetermined rule.

Second Embodiment

Figure 9:
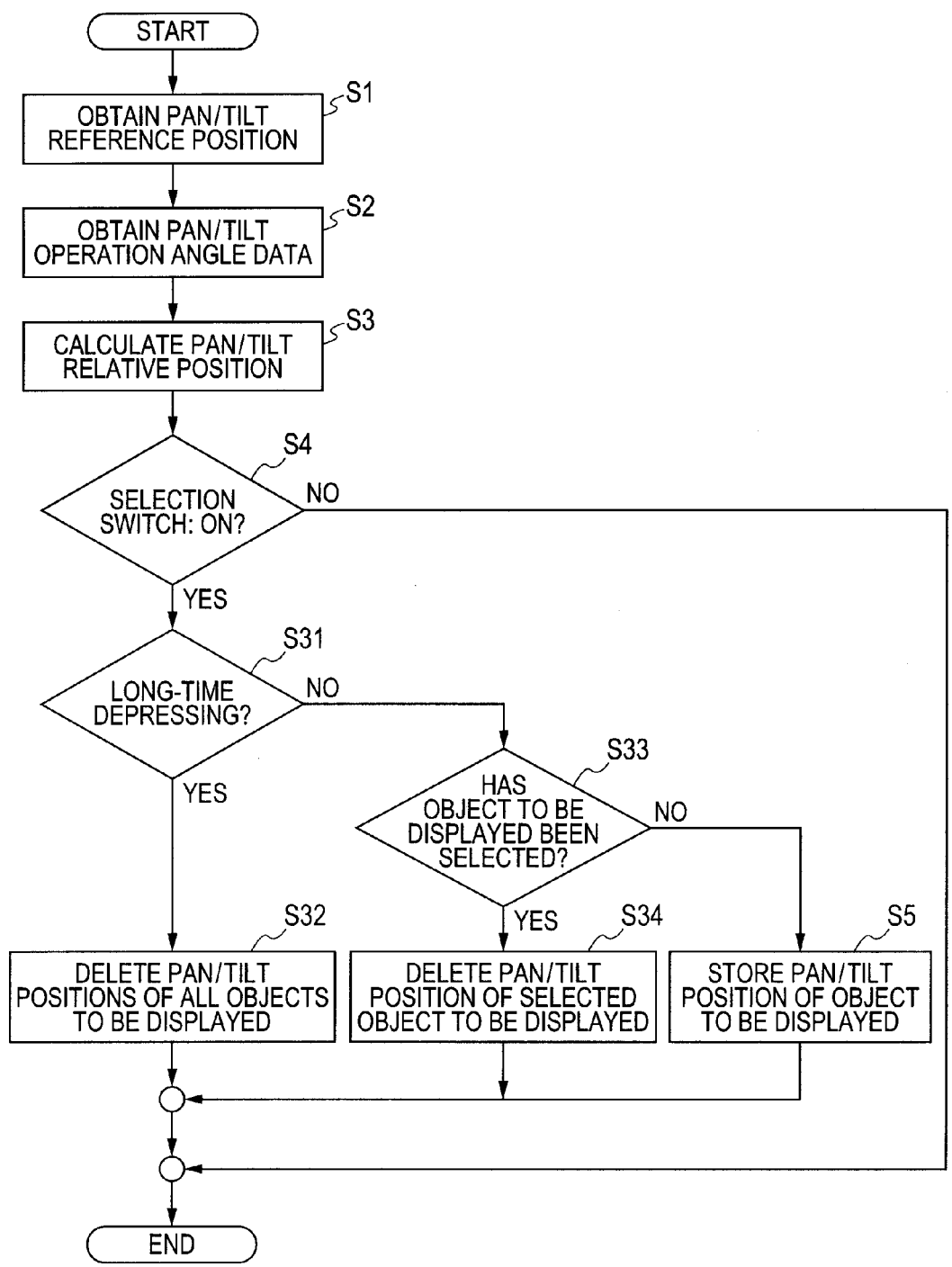
FIG. 9 is a flow chart illustrating a flow of storage processing for a horizontal angle and a vertical angle that indicate a direction of an object to be displayed and cancellation processing according to a second embodiment.

Referring to FIG. 9, a second embodiment of the present invention is described.

In the first embodiment, the example in which the selection switch 4 is used for selecting an object is described. Also described in the first embodiment is the example in which the ranging area is set to the object to be displayed even if the person taking the image changes the frame composition through the pan/tilt operation or the zoom operation after the object selection. However, if the object moves and accordingly the positional relation between the lens apparatus 1 and the object changes, the ranging area deviates from the object to be displayed.

In this embodiment, a method of canceling the ranging area of the selected object to be displayed in this case is described.

The configuration of an image taking system, the configuration of an AF sensor, and the calculation method for the object distance of the second embodiment are the same as those of the first embodiment respectively illustrated in FIG. 1, FIG. 2 and FIG. 4, and description thereof is therefore omitted herein.

A flow chart of FIG. 9 illustrates a flow of storage processing for the horizontal angle and the vertical angle that indicate the direction of the object to be displayed and cancellation processing. The lens CPU 130 controls the processing according to the computer program stored in the memory (direction storage unit) (not shown).

When the lens apparatus 1 is powered on, the processing of the lens CPU 130 proceeds to Step S1. Steps S1 to S4 are the same as those of the first embodiment illustrated in FIG. 3, and description thereof is therefore omitted herein.

When the selection switch 4 is turned ON in Step S4, the processing proceeds to Step S31.

In Step S31, it is determined whether or not the selection switch 4 remains in the ON state for a fixed period of time or longer (is depressed for a long time). When the selection switch 4 is depressed for a long time, the processing proceeds to Step S32, while when the duration of the ON state is shorter than the fixed period of time, the processing proceeds to Step S33. In Step S32, the horizontal angles and the vertical angles stored at present that indicate the directions of the positions of all the objects to be displayed are deleted, and the processing ends.

In Step S33, it is determined whether or not the present pan and tilt positions are the same as the stored horizontal angle and vertical angle of the object to be displayed. When the present pan and tilt positions are the same as the stored horizontal angle and vertical angle of the object to be displayed (selected object), the processing proceeds to Step S34, while when the present pan and tilt positions are different from the stored horizontal angle and vertical angle (corresponds to an unselected object), the processing proceeds to Step S5. In Step S34, the object to be displayed for which the horizontal angle and the vertical angle that are the same as the present pan and tilt positions are stored is deleted, and the processing ends. In Step S5, similarly to Step S5 of the first embodiment illustrated in FIG. 3, the present pan and tilt positions are stored as the horizontal angle and the vertical angle that indicate the direction of the object to be displayed, and the processing ends.

In the processing of the lens CPU 130, Step S1 is performed only at the time of power-on, and after the power-on, the flow of Steps S2 to S34 is repeated in a fixed cycle.

As described above, according to this embodiment, the present pan and tilt positions is constantly calculated, the object to be displayed is selected by turning ON the selection switch 4, and the present pan and tilt positions obtained through the calculation are stored as the horizontal angle and the vertical angle that indicate the direction of the object to be displayed. Further, when the selection switch 4 is turned ON at the same position of the object to be displayed that has been selected once (the object is selected again), the object can be deleted from the objects to be displayed. Further, when the selection switch 4 is depressed for a long time, all the objects to be displayed can be deleted. Accordingly, even if the object moves and the positional relation between the selected object and the lens apparatus 1 changes, the object to be displayed can be deleted easily.

Note that, in the processing of this embodiment, all the selected objects to be displayed are deleted by depressing the selection switch 4 for a long time, but alternatively, a switch for deleting all the objects to be displayed may be provided separately.

Further, in this embodiment, the manual deletion method for the target object using the selection switch 4 is described, but the present invention is not limited thereto. For example, the object distance of the target selected object may be monitored, and when the object distance largely changes, it is determined that the object moves out of the ranging area, which is followed by automatic deletion of the object from the target objects.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-227146, filed Sep. 30, 2009, which is hereby incorporated by reference herein in its entirety.

What is claimed is:

1. An image taking system, comprising:
   a lens apparatus;
   an image pickup apparatus;
   an operation angle detection unit for detecting an operation angle of the lens apparatus;
   a direction storage unit for storing a direction of an object with respect to the operation angle of the lens apparatus;
   an angle-of-field calculation unit for calculating an image taking angle of field based on a zoom position and a focus position of the lens apparatus;
   a ranging area setting unit for calculating a position of at least one object in an image taking screen based on the operation angle detected by the operation angle detection unit, the direction stored in the direction storage unit, and the image taking angle of field calculated by the angle-of-field calculation unit, to thereby set a ranging area at the position of the at least one object;
   an object distance calculation unit for calculating an object distance in the ranging area; and an output image generation unit for generating an output image containing a taken image generated by the image pickup apparatus and information based on the object distance corresponding to the ranging area.

2. An image taking system according to claim 1, further comprising a ranging position output unit for outputting position information indicating a position of the ranging area,
wherein the output image generation unit generates the output image by superimposing the object distance corresponding to the ranging area that is set by the ranging area setting unit on the position in the taken image corresponding to the position information.

3. An image taking system according to claim 1, further comprising an object selection unit for selecting an object for which the object distance is to be calculated,
wherein, when the object selection unit selects the object, the direction storage unit stores the operation angle obtained by the operation angle detection unit, as the direction of the object.

4. An image taking system according to claim 3, wherein the direction is deleted from the direction storage unit when the object selection unit selects an object located in the same direction as the direction stored in the direction storage unit.

5. An image taking system according to claim 1, further comprising a deletion unit for deleting the stored directions of all the objects from the direction storage unit.

6. An image taking system according to claim 1, wherein the operation angle detection unit comprises one of an angular velocity sensor and an angle sensor.

7. An image taking system according to claim 1, further comprising a support member for supporting the lens apparatus,
wherein the operation angle detection unit comprises a rotary encoder for detecting the operation angle of the lens apparatus with respect to the support member.

8. A lens apparatus of the image taking system according to claim 1, comprising the direction storage unit, the angle-of-field calculation unit, the ranging area setting unit, and the object distance calculation unit.

9. A lens apparatus according to claim 8, further comprising a phase difference sensor for detecting a phase difference between object images formed from light entering the lens apparatus,
wherein the object distance calculation unit calculates the object distance based on an output from the phase difference sensor.

10. A lens apparatus according to claim 9, further comprising a focus control unit for performing focus control based on the output from the phase difference sensor.

* * * * *